United States Patent [19]

Davis

[11] 4,346,473

[45] Aug. 24, 1982

[54] ERROR CORRECTION CODING METHOD AND APPARATUS FOR MULTILEVEL SIGNALING

[75] Inventor: Robert C. Davis, Indialantic, Fla.

[73] Assignee: Harris Corporation, Melbourne, Fla.

[21] Appl. No.: 125,084

[22] Filed: Feb. 26, 1980

[51] Int. Cl.$^3$ .............................................. G06F 11/10
[52] U.S. Cl. ........................................ 371/43; 371/2; 375/17
[58] Field of Search .................... 371/43, 44, 45, 2, 37; 375/17, 24, 39

[56] References Cited

U.S. PATENT DOCUMENTS

| 3,947,767 | 3/1976 | Koike et al. | 375/18 |
|---|---|---|---|
| 3,973,079 | 8/1976 | Fukinuki et al. | 375/17 |
| 4,110,945 | 8/1978 | Maxemchuk | 371/43 |
| 4,119,945 | 10/1978 | Lewis, Jr. et al. | 371/43 |
| 4,178,550 | 12/1979 | Acampora et al. | 371/43 |

OTHER PUBLICATIONS

M. P. Ristenbatt, Alternatives in Digital Communications, Proceedings of the IEEE, vol. 61, No. 6, Jun. 1973, pp. 703-721.

Metzner, Improvements in Block-Retransmission Schemes, IEEE Trans. on Comm., vol. COM-27, No. 2, Feb. 1979, pp. 524-532.

*Primary Examiner*—Charles E. Atkinson
*Attorney, Agent, or Firm*—Craig and Antonelli

[57] ABSTRACT

In typical error correction coding techniques for use in multilevel signalling schemes, such as M-level QAM signalling, the full data stream is encoded. In order to eliminate the need for such extensive coding while still allowing for accurate decisions as to the received data, the present system and method provide techniques for only encoding the lower significance bits of the multi-bit signal. The more significant bits are left uncoded. Accurate decisions are still possible in the majority of cases with this technique inasmuch as the most likely errors in uncoded transmission occur in deciding between adjacent received signal levels. These errors are eliminated by encoding the lower significance bits without the need for encoding the more significant bits.

44 Claims, 7 Drawing Figures

ERROR CORRECTION CODING METHOD AND APPARATUS FOR MULTILEVEL SIGNALING

The U.S. Government has rights in this invention pursuant to Contract No. F30602-77-C-0039, awarded by the Department of the Air Force.

FIELD OF THE INVENTION

The present invention relates generally to coding techniques, and, more particularly, to error correction coding techniques for use in multilevel signalling arrangements.

BACKGROUND OF THE INVENTION

In multilevel signalling systems such as M-level PAM or QAM systems, signals are transmitted having a voltage level representative of the value of a multi-bit signal input to the system. For example, in an 8-level PAM or QAM system, one of the voltage levels will be transmitted with each voltage level being indicative of the value of an input three bit digital signal.

Because of the high likelihood of an error at the receiving station in recognizing the exact transmitted level, coding is often used to ensure accurate recognition. Such coding can be limited to merely identifying any transmitted error. However, it is generally preferable that the error coding be used in a system which identifies an error and chooses the correct level after this error has been detected. Such systems are known as error correction coding systems.

In the past, error correction coding has been accomplished by encoding the full data stream being transmitted. Although this generally provides for satisfactory level recognition, it requires a great deal of coding. This, of course, greatly effects the practical bit rate of transmission.

From studying typical errors made in transmitting uncoded multilevel signals, it has been found that errors between adjacent voltage levels are by far the dominant types of errors. This can be seen by considering that the M levels are spaced by $\Delta$ volts, and that an adjacent level error is made for channel noise greater than $\Delta/2$ volts. On the other hand, for a non-adjacent error, channel noise voltage greater than $(3/2)\Delta$ must occur. The ratio of the two noise voltages is thus seen to be 3, or a power ratio of 9, which corresponds to approximately 9.5 dB. Thus, the probability of a non-adjacent error corresponds to a signal-to-noise ratio which is 9.5 dB higher than the probability of an adjacent level error. Therefore, the probability of symbol error is almost totally determined and dominated by the adjacent level errors.

From the fact that adjacent level errors are so dominant for the M/QAM systems (M>2), it can be very wasteful to use any of the error correction capability of coding to correct against non-adjacent level errors.

SUMMARY OF THE INVENTION

Accordingly, it is an object of the present invention to provide an improved coding system.

It is a further object of the present invention to provide improved error correction coding systems for use in multilevel signalling systems.

Yet another object of the present invention is to provide an improved error correction coding system for use in multilevel signalling systems which reduces the coding necessary while still allowing for accurate recognition of transmitted levels at the receiving station.

To accomplish these and other objects, the present invention provides an error coding system and method for use in multilevel signalling systems of the type for transmitting signals representative of the value of a multi-bit signal having a most significant bit and one or more lower significance bits. Prior to the transmission of the multilevel signals to a receiving station, at least one lower significance bit is encoded without encoding the most significant bit.

BRIEF DESCRIPTION OF THE DRAWINGS

Other objects and advantages of the present invention may be more clearly understood by reference to the following detailed description and drawings wherein.

DETAILED DESCRIPTION OF THE PREFERRED EMBODIMENTS

Figure 1:
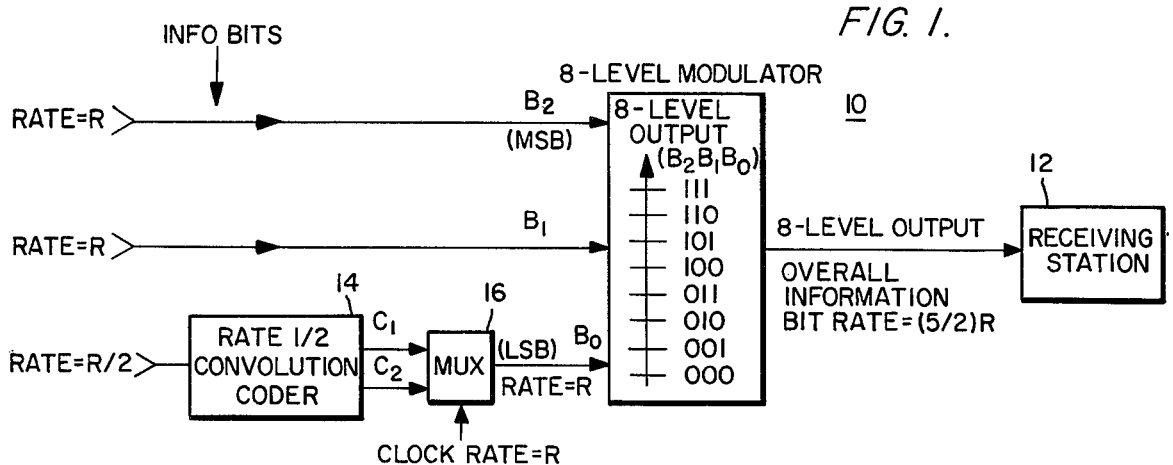
FIG. 1 is a block diagram of a first embodiment of the present invention.

Referring now to the drawings, and in particular to FIG. 1, an encoding system is shown that makes more effective use of the power of coding for multilevel signal alphabets than prior art systems. The reason for this more effective coding is that the system shown in FIG. 1 makes use of the fact that correction of adjacent level errors is required much more often than correction of non-adjacent level errors.

As shown in FIG. 1, an 8-level PAM modulator 10 (which could be one of the quadrature channels of an 8-QAM modulator) receives a most significant information bit $B_2$, a less significant bit $B_1$, and at least significant bit $B_0$. The output voltage level of the 8-level modulator 10 is representative of the value of the information bits $B_2$, $B_1$, and $B_0$. Such 8-level modulators are known in the art, and are readily constructed without undue experimentation. The output of the 8-level modulator 10 is then transmitted to a receiving station 12 where it is demodulated to detect the transmitted voltage level to determine the value of the transmitted information bits.

In FIG. 1, the least significant bit $B_0$ input to the 8-level modulator 10 is actually a coded bit from a rate $\frac{1}{2}$ coder 14 which has been multiplexed in the multiplexer 16. The other two bits $B_1$ and $B_2$ input to the 8-level modulator 10 are uncoded information bits. Thus, this encoding scheme carries two and one-half information bits per 8-level symbol as opposed to three bits in the uncoded case. The overall coding rate is, therefore, 2.5/3=5/6.

Figure 7:
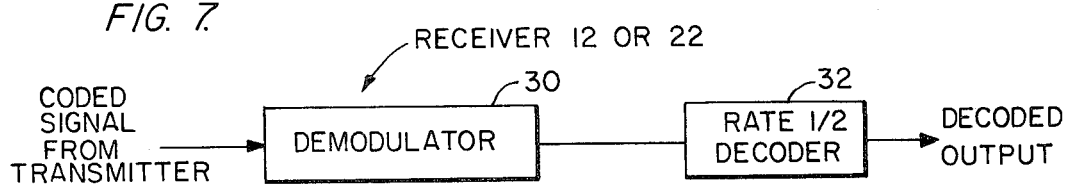
FIG. 7 shows a receiver for use in accordance with the present invention.

An important aspect of the present invention is that the rate $\frac{1}{2}$ coding has been applied only to the least significant bit of the 8-level symbol. The basic purpose of this encoding strategy is to use the error correcting capability of the rate $\frac{1}{2}$ code to resolve which of two adjacent 8-ary levels was transmitted. To accomplish this at the receiving station 12, a demodulator 30 in the receiving station demodulates the received signal so that only the two 8-ary levels (see FIG. 7) immediately above and immediately below the received level are retained as decision candidate levels. From the 8-level mapping shown in FIG. 1, it is seen that between any two adjacent levels one of the two retained levels has a 0 in the least significant bit position and the other retained level has a 1 in the least significant bit position. Thus, as far as deciding between the two candidate levels is concerned, only a binary decision must be made.

The binary rate $\frac{1}{2}$ code, employed in the fashion shown in FIG. 1 on the least significant bit $B_0$, is ideally suited for making such a binary decision. The correlation of the received level with the coded bit (0) which is the candidate level with a 0 in the least significant bit position, and the correlation of the coded bit (1) which is the candidate level with a 1 in the least significant bit position, can be computed and fed to a rate $\frac{1}{2}$ decoder 32 in the receiving station 12 for deciding on the least significant bit $B_0$ (see FIG. 7). Once a decision is made on $B_0$, the two corresponding bits, $B_1$ and $B_2$, simply "tag along" with the coded least significant bit inasmuch as the demodulator 30 in the receiver station 12 has already limited the decision to one of two adjacent levels. Thus, a decision is implicitly made on the bits $B_1$ and $B_2$ at the same time that a decision is made by the decoder 32 on the least significant bit. Therefore, this scheme follows the premise set forth above that the power of the error correction code be concentrated upon a resolution of the adjacent level errors.

The performance improvement obtainable with the coder/decoder arrangement discussed above is limited by the probability that the correct 8-ary level might be eliminated on the initial narrowing-down process by the demodulator 30 in selecting only the closest two 8-ary levels. It can be seen that if the spacing between the levels is $\Delta$ volts, then a noise greater than $\Delta$ volts is required to push the transmitted level to a point between two levels, neither of which is the transmitted level. Thus, if the channel noise is greater than $\Delta$ volts, an incorrect level may be chosen using the system of FIG. 1. On the other hand, an error is made in an uncoded system for a noise greater than $\Delta/2$ volts. Thus, the possibility exists for obtaining almost 6 dB (less the coding band spread loss) of gain over an uncoded 8-level system.

Figure 2:
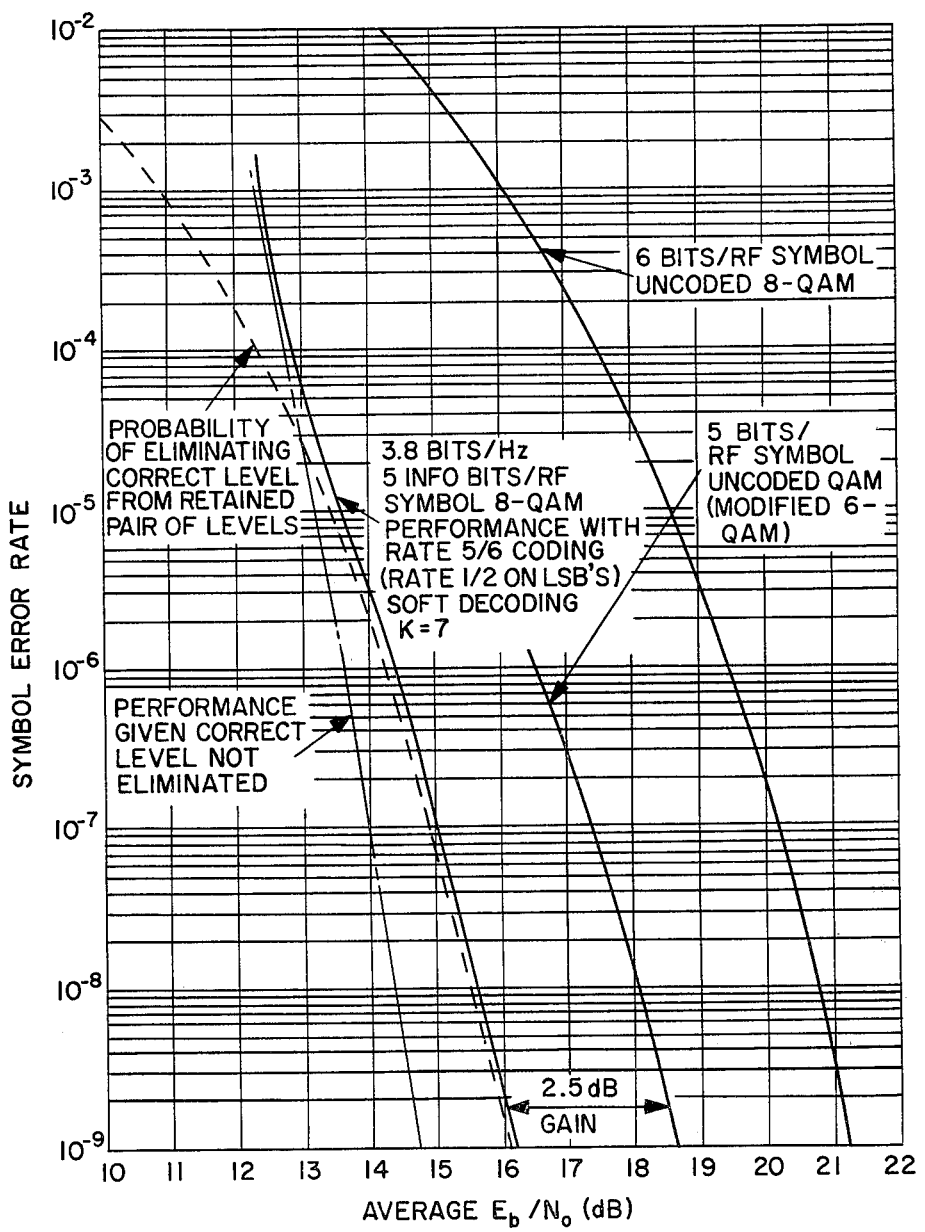
FIG. 2 is a graph showing the improvement over uncoded QAM signals possible using the embodiment shown in FIG. 1.

FIG. 2 shows an example of the improvement computed for a constraint length 7 rate $\frac{1}{2}$ convolution code applied to the least significant bit in the arrangement described in FIG. 1 for 8-QAM signalling. A soft decision Viterbi decoder as the decoder 32 in the receiving station 12 is assumed. It is to be noted that with the use of this powerful rate $\frac{1}{2}$ code, the performance is limited by the probability of eliminating the correct level from the retained pair.

The gain relative to the 8-QAM signal as shown in FIG. 2 is 5.2 dB at a symbol error rate of $10^{-9}$. However, since the coded signal in the system of FIG. 1 carries only five information bits per RF symbol, the true coding gain should be compared with reference to five-bit/symbol uncoded modulation. Such a signal is modified 6-QAM (6-QAM with 4 corner signals eliminated), and the performance of this uncoded modulation is also plotted in FIG. 2 for reference. As shown, the coded system gains 2.5 dB relative to the modified 6-QAM uncoded signalling. Both the coded 8-QAM scheme and the uncoded modified 6-QAM scheme can operate at 3.8 bits/second/Hz in a practical system.

Figure 3:
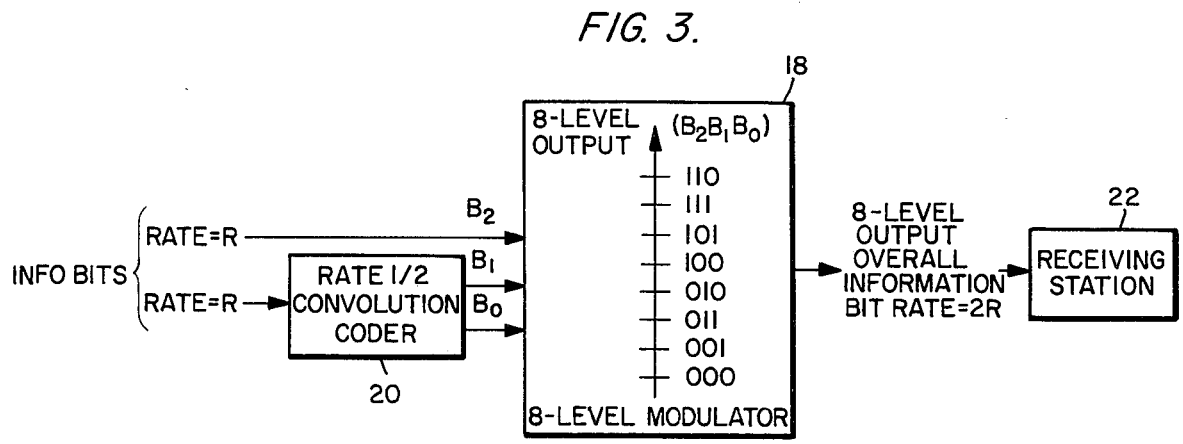
FIG. 3 is a block diagram of a second embodiment of the present invention.

Another embodiment of a coding system for use with an 8-QAM modulator 18 in situations of high channel noise is shown in FIG. 3. Here, the most significant information bit $B_2$ "tags along" with the decision made for the two rate $\frac{1}{2}$ coded lower significant bits $B_0$ and $B_1$ which are coded in a coder 20. The three bits $B_0$, $B_1$ and $B_2$ are applied to an 8-level modulator with the level assignments shown in FIG. 3. Note that with the level assignments shown, any set of four successive 8-ary levels contains all four rate $\frac{1}{2}$ code branches, i.e., $B_0B_1 = 00$, 01, 10, and 11. In a receiver 22, a demodulator 30 determines the four levels closest to the received level as decision candidates. Then, a rate $\frac{1}{2}$ decoder 32 in the receiving station 22 will resolve which of the four candidates was actually transmitted.

In the system shown in FIG. 3, if the spacing between adjacent levels is $\Delta$ volts, then a noise of $2\Delta$ volts is required to eliminate the correct level from the set of four retained candidates. Therefore, the system of FIG. 3 can operate in conditions of high channel noise. The 8-level symbol error rate in an uncoded situation, on the other hand, is dominated by noise exceeding $\Delta/2$ (i.e. half the spacing). Thus, the probability of eliminating the correct code on the four candidate selection process at the receiver 22 is 12 dB better (less the coding band spread loss) than the symbol error rate of the uncoded 8-level arrangement. Since the coded arrangement described above is capable of carrying two bits per 8-level symbol, whereas the uncoded arrangement carries three bits per 8-level symbol, the overall code rate is $\frac{2}{3}$. Of course, this requires more use of coding than the arrangement of FIG. 1. But the system of FIG. 3 still significantly reduces the amount of coding necessary relative to prior systems wherein the entire data stream is coded.

Figure 4:
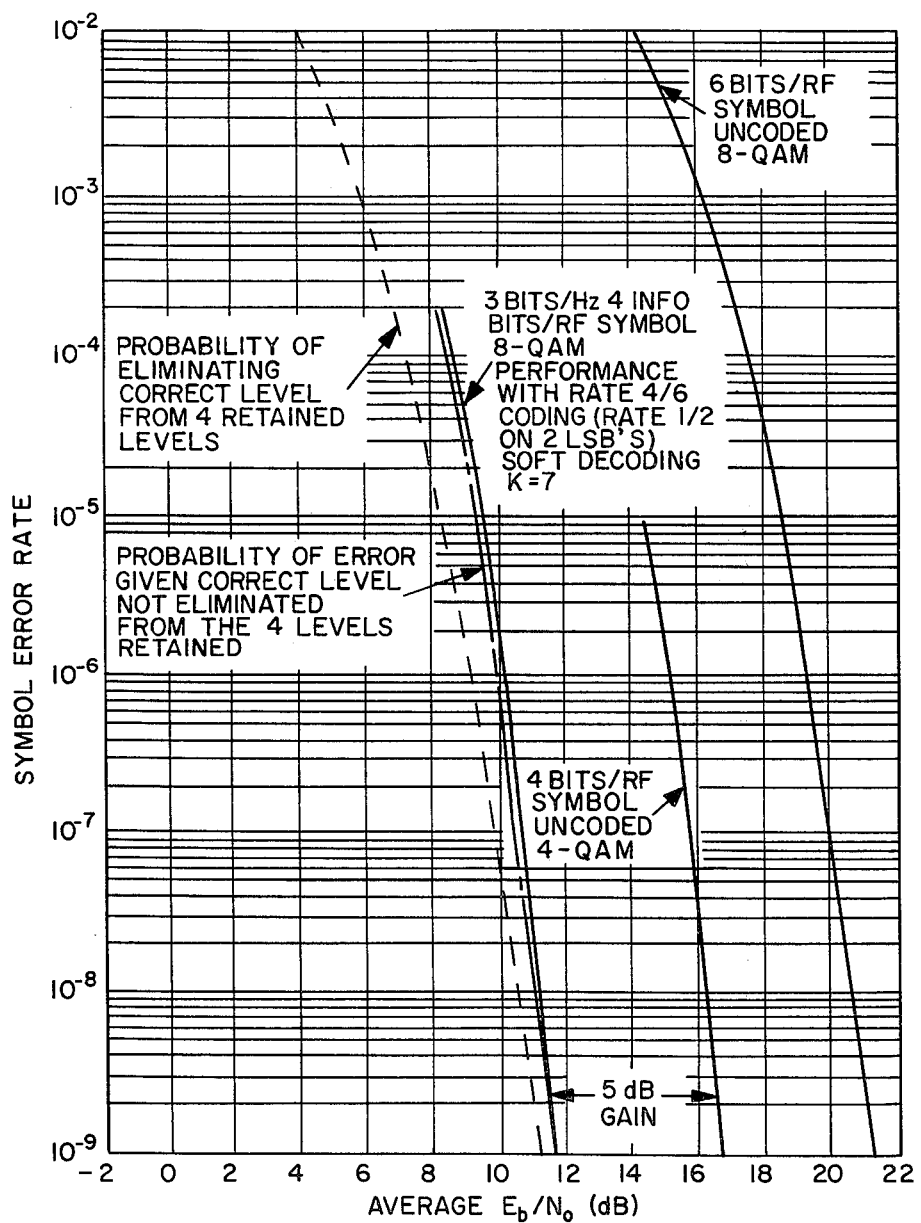
FIG. 4 is a graph showing the improvement over uncoded QAM systems which may be achieved using the second embodiment shown in FIG. 3.

Application of the 8-level coding arrangement of FIG. 3 to both quadrature legs of an 8-QAM modulator when a constraint length 7, rate $\frac{1}{2}$ encoder is employed, along with a soft decision Viterbi algorithm decoder at the receiver 22, produces the performance shown in FIG. 4. The coded 8-QAM arrangement carries four information bits per 8-QAM symbol. Comparing the performance at a $10^{-9}$ symbol error rate shows that 5 dB of coding gain is obtained relative to the equivalent capacity uncoded 4-QAM scheme. Both arrangements can be used at three bits/second/Hz in a practical modem design.

Figure 5:
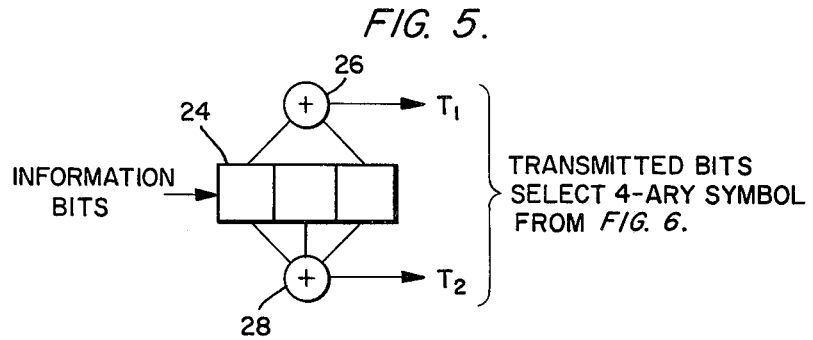
FIGS. 5 and 6 show arrangements for encoding the two least significant bits in accordance with the embodiment of FIG. 3.

FIG. 5 shows one embodiment of a convolution encoder which can be used as the encoder 20 from FIG. 3. As discussed above, the decoder in the receiver 22 must have the ability to select which of the four adjacent levels was actually transmitted based on the coding of the two least significant bits $B_0$ and $B_1$. Various coding and decoding arrangements which are known in the art for encoding and decoding 4-ary data signals can be used for these purposes. However, the encoding shown in FIG. 5, in conjunction with the baseband voltage assignments shown in FIG. 6, provides an especially effective technique for distinguishing between these four levels.

In FIG. 5, binary information bits are fed into a three-stage shift register 24. It is to be understood that a three-stage shift register is shown for example only, and a higher constraint length arrangement could be used as well as higher level arrangements. In the conventional manner, as each information bit is fed into the shift register 24, it moves the previously inserted bit one place to the right. A first modulo-2 adder 26 is coupled to the first and third stages of the shift register 24. A second modulo-2 adder 28 is coupled to all three stages of the shift register 24. These modulo-2 adders 26 and 28 respectively produce code branch bits $T_1$ and $T_2$ which, of course, are a function of the present values in the shift register 24. Therefore, it can be seen that for each binary bit fed into the shift register 24, a pair of code branch bits $T_1$ and $T_2$ are produced with respective values corresponding to the shift register contents.

Figure 6:
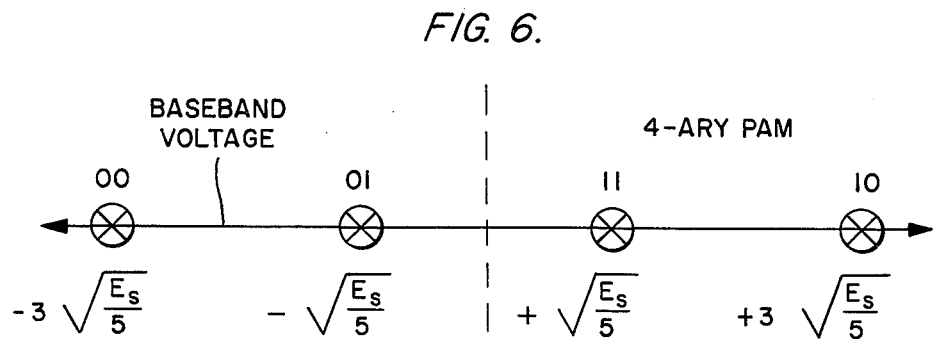

The values of $T_1$ and $T_2$ are used to select baseband voltages for transmission in accordance with the baseband voltage assignments of FIG. 6. Referring to FIG. 6, it can be seen that the baseband assignment of voltages is as follows:

If $T_1 = 0$ and $T_2 = 0$ (1)

Baseband $V_{00} = -3\sqrt{\dfrac{E_s}{5}}$

If $T_1 = 0$ and $T_2 = 1$ (2)

Baseband $V_{01} = -\sqrt{\dfrac{E_s}{5}}$

If $T_1 = 1$ and $T_2 = 1$ (3)

Baseband $V_{11} = \sqrt{\dfrac{E_s}{5}}$

If $T_1 = 1$ and $T_2 = 0$ (4)

Baseband $V_{10} = 3\sqrt{\dfrac{E_s}{5}}$ where $E_s$ = average energy per symbol if all four levels are equally likely to occur.

With this arrangement, each of the transmitted four level symbols of FIG. 6 will convey one information bit to the receiver 22. $E_s$ in this case will then be equivalent to $E_b$, the average energy per bit.

In FIG. 6, it can be seen that each of the baseband voltages is spaced apart by a voltage equal to $$2 \times \sqrt{\dfrac{E_s}{5}}.$$

Further, the value assignment to the particular bits is such that the antipodal symbols (i.e. those symbols which differ from one another by both of their bits) are spaced apart by two distance increments $$\left( \text{i.e. } 4\sqrt{\dfrac{E_s}{5}} \right).$$

Thus, the value for $$00\left( -3 \times \sqrt{\dfrac{E_s}{5}} \right)$$

differs from its antipodal bit symbol 11

$$\left( \sqrt{\dfrac{E_s}{5}} \right)$$

by a value of $$4\sqrt{\dfrac{E_s}{5}}.$$

Similarly, the antipodal symbols 10 and 01 have a similar baseband voltage spacing. Also, each adjacent symbol is orthogonal (i.e. only differs by one bit) relative to the bit signal next to it on the baseband scale.

In the decoder in the receiver 22, the received $T_1$ and $T_2$ sequenced pairs are correlated in a conventional manner, such as Viterbi decoder, against known sequences to determine which information bits were originally put into the shift register 24.

An important aspect of the arrangement shown in FIGS. 5 and 6 is that the particular selection of the baseband voltages serves to improve the minimum voltage distance possible between any two of the code paths which can exist for the various sequences of $T_1$ and $T_2$. The distance structure of the code of FIG. 5 is such that the minimum distance between any two of the possible transmitted code paths involves two antipodal code branches and one orthogonal code branch. With the Grey-code encoding of $T_1$ and $T_2$, onto the 4-ary PAM, as shown in FIG. 6, this produces a minimum distance between the paths of at least:

$$d^2_{code} = 2\left(4\sqrt{\dfrac{E_b}{5}}\right)^2 + \left(2\sqrt{\dfrac{E_b}{5}}\right)^2 \quad (5)$$

or $$d_{code} = 6\sqrt{\dfrac{E_b}{5}} \quad (6)$$

For binary PSK, as a standard for comparison, the minimum distance is:

$$d_{PSK} = 2\sqrt{E_b} \quad (7)$$

Comparing equations 6 and 7 shows that the simple coding scheme has a 2.5 dB advantage over binary PSK even though both schemes are 1-bit/transmitted symbol schemes and would require essentially the same channel bandwidth.

The coded scheme shown in FIGS. 5 and 6 would require a constraint length 3-Viterbi decoder in the receiver 22 with the four branch metrics computed by correlating each received symbol against each of the four possible PAM levels. It should be noted that the use of a constraint length 7-convolution code instead of the constraint length 3-convolution code shown in FIGS. 5 and 6 will gain 4.5 dB over PSK when employed with the above arrangement.

The above example serves to demonstrate the importance of considering the coding and modulation processes jointly. A 4-ary uncoded modulation scheme alone considered above loses approximately 4 dB in terms of $E_b/N_o$ relative to PSK. The constraint length 3-code gains roughly 1.8 dB relative to the PSK channel. One might assume, therefore, on the basis of a cursory examination, that the coded scheme described above would lose 2.2 dB relative to PSK. In fact, a gain of 2.5 dB is achieved when a mating of code assignments to the 4-ary PAM levels shown in FIG. 6 is considered. This is one reason why this particular arrangement is especially useful for operation as an encoder in the device shown in FIG. 3.

These above-discussed coding gains which are available with reasonable coding strategies enhance the flexibility and desirability of the M-ary QAM modulation arrangements for spectrally efficient digital data transmission. The coding results show that coding can be profitably incorporated into an existing uncoded M-QAM modem to obtain improved performance. The arrangements set forth above can serve as new coding strategies for spectrally efficient modems. They concentrate the power of the error correction codes where they are most needed in a spectrally efficient multilevel modem (that is, on a resolution of possible levels close to the received level). Possible levels sufficiently removed from a received level are so unlikely as to be totally disregarded as viable decision candidates. Dramatic gains using relatively simple coder/decoder arrangements follow from an adoption of this viewpoint.

Although the above discussion has been made in terms of 8-PAM and 8-QAM systems with three bit inputs, it is to be understood that other levels of PAM and QAM systems with both greater or smaller levels can be used. Also, the present invention can be used in conjunction with other modulation techniques if desired. For example, M-PSK modulation could be used in conjunction with coding only lower significance bits. With such an arrangement, resolution would be necessary between adjacent phase levels rather than adjacent voltage levels.

Also, although coding showing a rate ½ convolution coder has been described, it should be understood that other convolution code rates could be used. Further, different coding techniques could be used if desired.

In addition, although the description has been made in terms of encoding either only the least significant bit or the two least significant bits, it is to be understood that other low significance bits could also be encoded, if desired, especially in a system having levels greater than eight.

It is to be understood that the above-described arrangements are simply illustrative of the application of the principles of this invention. Numerous other arrangements may be readily devised by those skilled in the art which embody principles of the invention and fall within its spirit and scope.

I claim:

1. An error coding system for use in multilevel digital signalling systems comprising:
    means for providing a multi-bit signal having a most significant bit and at least one lower significance bit; and
    means for coding at least one of said lower significance bits without encoding the most significant bit of the multi-bit signal to provide an error coded signal for transmission to a receiving station.

2. A system according to claim 1, wherein the coding is used for error correction coding so that the transmitted signal is an error correction coded signal which allows correction of any errors detected at the receiving station.

3. A system according to claim 2, wherein only a least significant bit is coded.

4. A system according to claim 2, wherein the multi-bit signal includes at least three bits and wherein only the two least significant bits are encoded.

5. A system according to claim 3, wherein the transmitted error correction coded signal is transmitted with a voltage level representative of the value of the multi-bit signal, the system further comprising:
    means in said receiving station to receive the error correction coded signal;
    means for limiting the decision of the actual transmitted level of the error correction coded signal to a choice of two adjacent levels; and
    means for selecting which of the two adjacent levels of the received signal represents the actual transmitted level based on an evaluation of the coding of the least significant bit.

6. A system according to claim 4, wherein the transmitted error correction coded signal is transmitted with a voltage level representative of the value of the multi-bit signal, the system further comprising:
    means in said receiving station to receive the error correction coded signal;
    means for limiting the decision of the actual transmitted level of the error correction coded signal to a choice of four adjacent levels; and
    means for selecting which of the four adjacent levels of the received signal represents the actual transmitted level based on an evaluation of the coding of the two least significant bits.

7. A system according to claim 2, wherein the error correction coded signal is transmitted as a pulse amplitude modulated signal.

8. A system according to claim 2, wherein the error correction coded signal is transmitted as a quadrature amplitude modulated signal.

9. A system according to claim 2, wherein the multi-bit signal is a three bit signal, and the transmitted error correction coded signal is one of eight possible voltage levels representative of the values of the three bit signal.

10. A system according to claim 2, further comprising a convolution coder for coding said lower significance bit.

11. A system according to claim 10, wherein said convolution coder is a ½ rate convolution coder.

12. A system according to claim 3, wherein the multi-bit signal is a three bit signal and the system further comprises a ½ rate convolution coder for coding the least significant bit such that the overall code rate for the three bit signal is 5/6.

13. A system according to claim 4, wherein the multi-bit signal is a three bit signal, and the system further comprises a ½ rate convolution coder for coding the two least significant bits so that the overall signal code rate is ⅔.

14. A system according to claim 10, wherein the receiving station includes a soft decision Viterbi decoder for decoding the convolution coded signal.

15. A system according to claim 3, wherein the transmitted encoded signal is an eight level quadrature amplitude modulated signal transmitted at 3.8 bits/sec/Hz.

16. A system according to claim 4, wherein the transmitted encoded signal is an eight level quadrature amplitude modulated signal transmitted at 3 bits/sec/Hz.

17. A system according to claim 1, 2 or 6, wherein the means for encoding the lower significance bits comprise means for converting each received lower significance bit into a pair of code branch bits $T_1$ and $T_2$, and further comprising means for using each code branch bit pair to select one of a group of baseband voltages for transmission to the receiver station, wherein a plurality of the transmitted baseband voltages produce a code path, and wherein the minimum distance between any two code paths is:

$$d_{code} = 6\sqrt{\frac{E_b}{5}}.$$

18. A system according to claim 17, wherein the code branch bits $T_1$ and $T_2$ select baseband voltages for transmission according to the following relationships:

If $T_1 = 0$ and $T_2 = 0$

Baseband $V_{00} = -3\sqrt{\frac{E_s}{5}}$

If $T_1 = 0$ and $T_2 = 1$

Baseband $V_{01} = -\sqrt{\frac{E_s}{5}}$

If $T_1 = 1$ and $T_2 = 1$

Baseband $V_{11} = \sqrt{\frac{E_s}{5}}$

If $T_1 = 1$ and $T_2 = 0$

Baseband $V_{10} = 3\sqrt{\frac{E_s}{5}}$ where $E_s$ = average energy per symbol if all four levels are equally likely to occur.

19. A system according to claim 17, wherein the means for encoding further comprises:
a shift register for receiving each lower significance bit;
a first modulo-2 adder coupled to a first set of stages of the shift register to produce the code branch bit $T_1$; and
a second modulo-2 adder coupled to a second set of stages of the shift register different than the first set of stages to produce the code branch bit $T_2$.

20. A system for encoding an information bit stream having a most significant bit and at least one lower significant bit for transmission over a transmission channel to a receiving station, comprising:
means for converting at least one of said lower significant bits in the bit stream into a pair of code branch bits $T_1$ and $T_2$ without encoding the most significant bit;
means for using each code branch bit pair to select one of a group of baseband voltages for transmission to the receiving station,
wherein a plurality of the transmitted baseband voltages produce a code path, and wherein the minimum distance between any two code paths is:

$$d_{code} = 6\sqrt{\frac{E_b}{5}}.$$

21. A system according to claim 20, wherein the code branch bits $T_1$ and $T_2$ select baseband voltages for transmission according to the following relationships:

If $T_1 = 0$ and $T_2 = 0$

-continued

Baseband $V_{00} = -3\sqrt{\frac{E_s}{5}}$

If $T_1 = 0$ and $T_2 = 1$

Baseband $V_{01} = -\sqrt{\frac{E_s}{5}}$

If $T_1 = 1$ and $T_2 = 1$

Baseband $V_{11} = \sqrt{\frac{E_s}{5}}$

If $T_1 = 1$ and $T_2 = 0$

Baseband $V_{10} = 3\sqrt{\frac{E_s}{5}}$ where $E_s$ = average energy per symbol if all four levels are equally likely to occur.

22. A system according to claim 20, wherein the means for encoding further comprises:
a shift register for receiving each lower significance bit;
a first modulo-2 adder coupled to a first set of stages of the shift register to produce the code branch bit $T_1$; and
a second modulo-2 adder coupled to a second set of stages of the shift register different than the first set of stages to produce the code branch bit $T_2$.

23. An error coding method for use in a multilevel digital signalling system comprising:
providing a multi-bit signal having a most significant bit and at least one lower significance bit; and
coding at least one of said lower significance bits without encoding the most significant bit in the multi-bit signal to provide an error coded signal for transmission to a receiving station.

24. A method according to claim 23, wherein the coding is used for error correction coding so that the transmitted signal is an error correction coded signal permitting the receiving station to correct any errors detected in the received signal.

25. A method according to claim 24, wherein only a least significant bit is encoded.

26. A method according to claim 24, wherein the multi-bit signal includes at least three bits, and wherein only the two least significant bits are encoded.

27. A method according to claim 25, wherein the transmitted error correction coded signal is transmitted with a voltage level representative of the value of the multi-bit signal, the method further comprising:
receiving the error correction coded signal at the receiving station;
limiting the decision of the actual transmitted level of the error correction coded signal to a choice of two adjacent levels; and
selecting which of the two adjacent levels of the received signal represents the actual transmitted level based on an evaluation of the coding of the least significant bit.

28. A method according to claim 26, wherein the transmitted error coded signal is transmitted with a voltage level representative of the value of the multi-bit signal, the method further comprising:
receiving the error correction coded signal at the receiving station;
limiting the decision of the actual transmitted level of the error correction coded signal to a choice of four adjacent levels, and selecting which of the four adjacent levels of the received signal represents the actual transmitted level based on an evaluation of the coding of the two least significant bits.

29. A method according to claim 24, wherein the error correction coded signal is transmitted as a pulse amplitude modulated signal.

30. A method according to claim 24, wherein the error correction coded signal is transmitted as a quadrature amplitude modulated signal.

31. A method according to claim 24, wherein the multi-bit signal is a three bit signal and the transmitted error correction coded signal is one of eight possible voltage levels representative of the value of the three bit signal.

32. A method according to claim 24, wherein the coding of said lower significance bit is performed by convolution coding.

33. A method according to claim 32, wherein the convolution coding is $\frac{1}{2}$ rate convolution coding.

34. A method according to claim 25, wherein the multi-bit signal is a three bit signal and the system further comprises a $\frac{1}{2}$ rate convolution coder for coding the least significant bit so that the overall code rate is 5/6.

35. A method according to claim 26, wherein the multi-bit signal is a three bit signal and the system further comprises a $\frac{1}{2}$ rate convolution coder for coding the two least significant bits such that the overall code rate is $\frac{2}{3}$.

36. A method according to claim 32, further comprising using a Viterbi decoding arrangement at the receiving station for decoding the convolution coded signal.

37. A method according to claim 25, wherein the transmitted correction coded signal is an eight level quadrature amplitude modulated signal transmitted at 3.8 bits/sec/Hz.

38. A method according to claim 26, wherein the transmitted error correction coded signal is an eight level quadrature amplitude modulated signal transmitted at 3 bits/sec/Hz.

39. A method according to claim 23, 24, or 28, wherein the step of encoding the lower significance bits comprises converting each lower significance bit into a pair of code branch bits $T_1$ and $T_2$, and further comprising using each code branch bit pair to select one of a group of baseband voltages for transmission to the receiving station, wherein a plurality of transmitted baseband voltages produce a code path, and wherein the minimum distance between any two paths is:

$$d_{code} = 6\sqrt{\frac{E_b}{5}}.$$

40. A method according to claim 39, wherein the code branch bits $T_1$ and $T_2$ select baseband voltages for transmission according to the following relationships:

If $T_1 = 0$ and $T_2 = 0$

Baseband $V_{00} = -3\sqrt{\frac{E_s}{5}}$

If $T_1 = 0$ and $T_2 = 1$

Baseband $V_{01} = -\sqrt{\frac{E_s}{5}}$

-continued

If $T_1 = 1$ and $T_2 = 1$

Baseband $V_{11} = \sqrt{\frac{E_s}{5}}$

If $T_1 = 1$ and $T_2 = 0$

Baseband $V_{10} = 3\sqrt{\frac{E_s}{5}}$ where $E_s$ = average energy per symbol if all four levels are equally likely to occur.

41. A method according to claim 39, further comprising:
inserting each lower significance bit into a shift register;
modulo-2 adding a first set of stages of the shift register to produce the code branch bit $T_1$; and
modulo-2 adding of a second set of stages of the shift register different than the first set of stages to produce the code branch bit $T_2$.

42. A method for encoding an information bit stream having a most significant bit and at least one lower significant bit for tramsmission over a transmission channel to a receiving station comprising:
converting at least one of said lower significant bits into a pair of code branch bits $T_1$ and $T_2$ without encoding the most significant bit;
using each code branch bit pair to select one of a group of baseband voltages for transmission to the receiving station,
wherein a plurality of the transmitted baseband voltages produce a code path, and wherein the minimum distance between any two code paths is:

$$d_{code} = 6\sqrt{\frac{E_b}{5}}.$$

43. A method according to claim 42, wherein the code branch bits $T_1$ and $T_2$ select baseband voltages for transmission according to the following relationships:

If $T_1 = 0$ and $T_2 = 0$

Baseband $V_{00} = -3\sqrt{\frac{E_s}{5}}$

If $T_1 = 0$ and $T_2 = 1$

Baseband $V_{01} = -\sqrt{\frac{E_s}{5}}$

If $T_1 = 1$ and $T_2 = 1$

Baseband $V_{11} = \sqrt{\frac{E_s}{5}}$

If $T_1 = 1$ and $T_2 = 0$

Baseband $V_{10} = 3\sqrt{\frac{E_s}{5}}$ where $E_s$ = average energy per symbol if all four levels are equally likely to occur.

44. A method according to claim 42, further comprising:
inserting each lower significance bit into a shift register;
modulo-2 adding a first set of stages of the shift register to produce the code branch bit $T_1$; and
modulo-2 adding of a second set of stages of the shift register different than the first set of stages to produce the code branch bit $T_2$.

* * * * *